(12) United States Patent
Tan et al.

(10) Patent No.: US 7,328,283 B2
(45) Date of Patent: Feb. 5, 2008

(54) HEADER COMPRESSION/DECOMPRESSION APPARATUS AND HEADER COMPRESSION/DECOMPRESSION METHOD

(75) Inventors: Pek-Yew Tan, Singapore (SG); Chan-Wah Ng, Singapore (SG); Wei-Lih Lim, Singapore (SG); Toyoki Ue, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 100 days.

(21) Appl. No.: 10/497,986

(22) PCT Filed: Aug. 11, 2003

(86) PCT No.: PCT/JP03/10203

§ 371 (c)(1),
(2), (4) Date: Jun. 8, 2004

(87) PCT Pub. No.: WO2004/015957

PCT Pub. Date: Feb. 19, 2004

(65) Prior Publication Data

US 2005/0083934 A1    Apr. 21, 2005

(30) Foreign Application Priority Data

Aug. 9, 2002  (JP) ............................. 2002-234043
Aug. 8, 2003  (JP) ............................. 2003-289974

(51) Int. Cl.
*G06F 15/16*    (2006.01)

(52) U.S. Cl. .............. 709/247; 709/236; 708/203; 370/392; 704/501; 704/504; 382/244

(58) Field of Classification Search ........ 709/246–247, 709/230, 249, 236; 370/474, 477, 392; 708/203, 708/200; 704/500, 501–504; 382/232, 244
See application file for complete search history.

(56) References Cited

U.S. PATENT DOCUMENTS 5,535,199 A * 7/1996 Amri et al. ................ 370/392
6,292,840 B1 * 9/2001 Blomfield-Brown et al. .......................... 709/247

(Continued)

FOREIGN PATENT DOCUMENTS

JP        2002 077242        3/2002

(Continued)

OTHER PUBLICATIONS

Giovanardi, A. et al., "Improved header compression for TCP/IP over wireless links", Electronic Letters, vol. 36, Nov. 2000, pp. 1958-1960.*

(Continued)

*Primary Examiner*—Oanh Duong
(74) *Attorney, Agent, or Firm*—Stevens, Davis, Miller & Mosher, LLP (57) ABSTRACT

A header compression/decompression apparatus that improves the throughput of an overall multilayer protocol stack at a network node. In this apparatus, an encoding section 106 compresses multilayer header information included in a protocol data unit on a multilayer protocol stack 101. A session context ID manager 112 generates a session context ID 401 which is formed by integrating information on compression of multilayer header information by the encoding section 106 and, for example, information for identifying a scheme for compressing multilayer header information.

7 Claims, 6 Drawing Sheets

U.S. PATENT DOCUMENTS

| | | | |
|---|---|---|---|
| 6,389,038 B1* | 5/2002 | Goldberg et al. | 370/471 |
| 6,608,841 B1* | 8/2003 | Koodli | 709/247 |
| 6,680,955 B1* | 1/2004 | Le | 370/477 |
| 6,711,164 B1* | 3/2004 | Le et al. | 370/392 |
| 6,751,209 B1* | 6/2004 | Hamiti et al. | 370/349 |
| 6,754,231 B1* | 6/2004 | Jonsson et al. | 370/474 |
| 6,763,031 B1* | 7/2004 | Gibson et al. | 370/428 |
| 6,791,982 B2* | 9/2004 | Westberg | 370/392 |
| 6,804,238 B1* | 10/2004 | Euget et al. | 370/392 |
| 6,839,339 B1* | 1/2005 | Chuah | 370/349 |
| 6,845,105 B1* | 1/2005 | Olsson et al. | 370/469 |
| 6,954,460 B2* | 10/2005 | DeMars | 370/392 |
| 6,963,931 B2* | 11/2005 | Bunn et al. | 709/246 |
| 6,967,964 B1* | 11/2005 | Svanbro et al. | 370/437 |
| 7,010,727 B1* | 3/2006 | Stucker | 714/52 |
| 7,024,490 B2* | 4/2006 | Hata et al. | 709/247 |
| 7,054,954 B2* | 5/2006 | Kalliokulju | 709/247 |
| 7,058,728 B1* | 6/2006 | Eklund | 709/247 |
| 7,061,936 B2* | 6/2006 | Yoshimura et al. | 370/474 |
| 7,130,314 B2* | 10/2006 | Bunn et al. | 370/474 |
| 7,154,895 B1* | 12/2006 | Bornemisza et al. | 370/392 |
| 7,155,173 B2* | 12/2006 | Leung et al. | 455/72 |
| 2001/0030963 A1* | 10/2001 | Yoshimura et al. | 370/393 |
| 2002/0062394 A1* | 5/2002 | Bunn et al. | 709/246 |
| 2002/0097723 A1* | 7/2002 | Tourunen et al. | 370/392 |
| 2003/0007512 A1* | 1/2003 | Tourunen et al. | 370/475 |
| 2003/0097476 A1* | 5/2003 | Saxena et al. | 709/247 |
| 2003/0103513 A1 | 6/2003 | Hans et al. | |
| 2003/0198226 A1* | 10/2003 | Westberg | 370/393 |
| 2003/0231625 A1* | 12/2003 | Calvignac et al. | 370/389 |
| 2003/0233478 A1* | 12/2003 | Chuah et al. | 709/247 |

FOREIGN PATENT DOCUMENTS

| | | |
|---|---|---|
| WO | 0049748 | 8/2000 |
| WO | 0174022 | 10/2001 |
| WO | WO 174022 A2 * | 10/2001 |

OTHER PUBLICATIONS

Perkins, S. et al., "Dependency removal for transport protocol header compression over noisy channels", ICC 97 Montreal, IEEE International Conference, vol. 2, Jun. 1997, pp. 1025-1029.*

Perkins, C. et al., "Effects of interleaving on RTP header compression", IEEE, vol. 1, pp. 111-117, 2000.*

Khiem, L. et al., "Efficient and robust header compression for real-time services", IEEE, vol. 2, pp. 924-928, 2000.*

Cellatoglu, A. et al., "Robust header compression for real-time services in cellular networks", 3G Mobile Communication Technologies, 2nd International Conference, pp. 124-128, 2001.*

Shah, M., "IP header compression in the SGSN", Proceedings IEEE, pp. 158-161, 2002.*

Miyazaki A. et al., "Robust Header Compression using Keyworkpackets", May 2000; http://WWW3.ietf.org/proceedings/00jul/I-D/rohc-rtp-kw-00.txt.*

Jacobson, V., "Compressing TCP/IP Headers for Low-Speed Serial Links", RFC 1144, Feb. 1990.*

PCT International Search Report dated Oct. 28, 2003.

Degermark, et al.; "IP Header Compression," RFC 2507, Feb. 1999, pp. 3-47.

* cited by examiner

HEADER COMPRESSION/DECOMPRESSION APPARATUS AND HEADER COMPRESSION/DECOMPRESSION METHOD

TECHNICAL FIELD

The present invention relates to a header compression/decompression apparatus and header compression/decompression method.

BACKGROUND ART

In some of the existing compression of protocol data unit (PDU), primary importance is given to compression of a data format in a single layer. One such technology is the Internet protocol (IP) header compression where the emphasis is on the compression of specific protocol layers.

Compression of header information according to prior art is centered on compression of Internet protocol stack addresses. Compressible headers include TCP, UDP, IPv4 and IPv6 base header and extension header (e.g., see "IP Header Compression" (Network Working Group Request for Comments No.2507, 1999)). For TCP packets, the Van additional mechanisms which improve the efficiency of VJ header compression (Van Jacobson compression) over lossy links are also described. For non-TCP packets, compression slow-start and periodic refreshes minimize a period during which a packet is discarded due to a loss of a header that would cause its context to be changed. There are hooks for adding header compression schemes on top of UDP, e.g., compression of RTP headers.

Header compression relies on many fields being constant or changing seldomly in consecutive packets belonging to the same packet stream. Fields which do not change among packets need not be transmitted at all. Fields which often change with small and/or predictable values, for example, TCP sequence numbers can be encoded by incrementing the value by 1 at a time, and therefore it is possible to significantly reduce the number of bits necessary for these fields. Fields which frequently or randomly change, for example, checksums or authentication data need to be transmitted within every header.

A general principle of header compression is to occasionally send a packet including a full header. Compressed headers which are subsequently sent reference the context established by the full header. Furthermore, the compressed header may also contain incremental changes to the context. This header compression scheme does not require that all packets in the same stream pass over the compressed link. However, in a TCP stream, the difference among subsequent headers can become more irregular and the compression rate may decrease. The corresponding TCP data and acknowledgment packets need not traverse the link in opposite directions, either.

This header compression scheme is useful on first-hop links or last-hop links as well as links in the middle of the network. When many (several hundreds of) packet streams traverse the link, a phenomenon that could be called CID thrashing could occur. In this case, headers seldom can be matched with an existing context and need to be sent without compression, that is, as full headers. It is possible to use techniques such as hysteresis to ensure the packet streams giving the highest compression rate maintain their context. It is highly possible that such techniques are more likely to be required in the middle of the network.

DISCLOSURE OF INVENTION

All networks have many protocol stack layers being implemented in each network node. Each protocol stack layer provides specific layer information such as address, port number, packet control data and data that protects the integrity making the packet more resilient to error during transmissions. In many cases, such information is duplicated over a certain period of time with regard to exchanging of packet data between protocol stack entities responsible for transmitting, receiving and connecting network nodes. The present invention eliminates irrelevance and redundancy in data packets that pass through more than one protocol stacks and between transmitting and receiving network nodes.

To support legacy multilayer protocol stack of network nodes, it becomes increasingly necessary for header compression to be deployed in reality. The present invention provides an apparatus and method capable of decoding and encoding an arbitrary number of layers of protocol stack which allows compressed header information to be supported on legacy network node. This is done without additionally changing the protocol stack.

Most wireless networks support network data transmission using packets for connectionless sessions. Increasing the possibility of a data packet successfully reaching the destination requires the data packet to be fragmented. Fragmentation of the data packet produces great overhead because the fragmentation involves duplication of header information. The present invention allows header information for data transfer of fragmented data packet transmission session to enable header compression.

In a wireless network, especially the IEEE802.11-based network, inter-frame time period is used between data packets in the wireless medium. This inter-frame period requires a considerable amount of time and bandwidth over a certain period of time, especially when there is large volume data exchange between two stations. The present invention provides an apparatus and method for reducing the inter-frame period. Furthermore, the present invention reduces a bandwidth to be consumed on the inter-frame period in data exchange between two stations during a long period of time.

The present invention enables two legacy network nodes without the header compression technique implemented on it's protocol stack to enable header compression by providing appropriate interfaces such that legacy control software can use header compression. Interfaces are provided on the control plane as well as the data plane to allow legacy data packets to continue to be used for data exchange between network nodes.

That is, it is an object of the present invention to provide a header compression/decompression apparatus and header compression/decompression method capable of improving the throughput of the entire multilayer protocol stack at network nodes.

An embodiment of the present invention solves the above described problems by allowing header compression to be used for exchanging of data packets between legacy network nodes and between network nodes including a new multilayer protocol stack without totally changing the protocol stack. For this purpose, one mode of the present invention uses a section that provides a multilayer protocol stack header information transcoder, a section that encodes and decodes header information so as to realize exchanges of low bit rate header information, a section that provides interfaces on the control plane and data plane of a legacy network protocol stack respectively so as to use header information compression, a section that starts a session for header compression, a section that compresses header information during a data session in which data is generally divided at wireless media, a section that reduces an interframe time period during data packet transmission at wireless media, a section that compresses header information of data packets from more than one protocol stack layer, a section that detects a data packet including compressed header information for a multilayer protocol stack layer, and a section for decoding compressed header information for the multilayer protocol stack.

Furthermore, the embodiment of the present invention uses an apparatus and mechanism provided by the multilayer protocol stack header information transcoder to eliminate redundancy and irrelevance of header information encapsulated in a data packet exchanged between two network nodes. The apparatus according to the embodiment of the present invention can perform control by adding two interfaces to the control plane and data plane for controlling between a layer control entity and protocol stack layer and exchanging data packet information, performing compression and decompression of header information. This apparatus performs a header compression session between a transmission node and a plurality of receiving network nodes by exchanging an appropriate frame first. When a control frame for indicating the end and beginning of compressed header information is lost, another control frame is exchanged to also indicate an update of header information which shortens a period necessary for error recovery. An encoding section of the transcoder not only performs a session carried out for header information compression but also eliminates redundant information and duplicate information. The header information is decompressed by a decoding section of the transcoder. The control information is sent to the transcoder by a protocol layer management entity and it is possible to control and specify the number of protocol layers participating in header information compression. Data packets transferred between protocol layers requiring exchanges of header information are also intercepted and sent to a transcoder subunit for subsequent processing. Processing carried out in the transcoder includes encoding, decoding, registration and deletion of header compression sessions.

Using the present invention eliminates redundancy and irrelevance of data packet header information and improves the throughput of payloads at different layers of a protocol stack. In short, the present invention improves the throughput and reduces consumption of an overhead bit rate, which can be an expensive commodity if transmission is carried out over wireless media. The present invention provides an apparatus and method which allow the multilayer protocol stack to use header compression. This reduces the overall overhead bit rate and improves the overall throughput for network nodes. The present invention further allows a legacy protocol stack and network nodes to use header compression without modification of the control mechanism of the existing protocol stack.

An aspect of the invention may be achieved by a header compression apparatus that is used with a node apparatus to transmit a protocol data unit on a multilayer protocol stack. The header compression apparatus includes a compression section that compresses each of a plurality of header information, which are included in the protocol data unit and correspond to a plurality of layers of the multilayer protocol stack respectively, using at least one of a plurality of compression schemes. A generation section obtains concatenated compression scheme information indicating how the plurality of header information are each compressed by the compression section, by generating and concatenating compression scheme information for each of the plurality of layers. The generation section generates identification information that represents the concatenated compression scheme information using a single unique expression or number.

Additionally, an aspect of the invention may be achieved by a header decompression apparatus that is used with a node apparatus that receives a protocol data unit on a multilayer protocol stack. The header decompression apparatus includes an acquisition section that acquires identification information, representing concatenated compression scheme information, using a single unique expression or number. The concatenated compression scheme information indicates how a plurality of header information, which are included in the protocol data unit and correspond respectively to a plurality of layers of the multilayer protocol stack, are each compressed. The concatenated compression scheme information is obtained by gathering and concatenating compression scheme information for each of the plurality of layers. A decompression section decompresses each of the plurality of header information based on the identification information acquired by the acquisition section using at least one of a plurality of compression schemes.

An aspect of the invention may also be achieved by a header compression method implemented upon transmission of a protocol data unit on a multilayer protocol stack. According to this method, each of a plurality of header information included in the protocol data unit and corresponding to a plurality of layers of the protocol stack respectively are compressed using at least one of a plurality of compression schemes. Compression scheme information is gathered for each of the plurality of layers. Concatenated compression scheme information indicating how the plurality of header information are each compressed is obtained by concatenating the compression scheme information for each of the plurality of layers. Identification information is generated that represents the concatenated compression scheme information using a single unique expression or number.

An aspect of the invention may be further achieved by a header decompression method implemented upon reception of a protocol data unit on a multilayer protocol stack. According to this method, identification information representing concatenated compression scheme information using a single unique expression or number is acquired. The concatenated compression scheme information: (1) indicates how a plurality of header information that are included in the protocol data unit and that correspond respectively to a plurality of layers of the multilayer protocol stack are each compressed and (2) is obtained by gathering and concatenating compression scheme information for each of the plurality of layers. Each of the plurality of header information is decompressed based on the identification information acquired by the acquisition section using at least one of a plurality of compression schemes.

An object of the invention may be achieved by a multilayer header compression apparatus having an obtainment section for obtaining from the same protocol data unit header information of a lower protocol layer of a plurality of protocol layers and header information of a higher protocol layer of the plurality of protocol layers. A compression section compresses the obtained header information of the lower protocol layer with a compression scheme for the lower protocol layer and the obtained header information of the higher protocol layer with a compression scheme for the higher protocol layer. A header information concatenation section concatenates the compressed header information of the lower and higher protocol layers to obtain compressed multilayer header information. A gathering section gathers from the lower and higher protocol layers scheme information indicating the compression scheme for the lower protocol layer and scheme information indicating the compression scheme for the higher protocol layer. A scheme information concatenation section concatenates the gathered scheme information from the lower and higher protocol layers to obtain a combination of the scheme information. A generation section generates identification information for the obtained combination of the scheme information by representing the obtained combination of the scheme information using a single unique expression or number. An addition section adds the generated identification information to the obtained, compressed multilayer header information.

Additionally, an object of the invention may be achieved by a multilayer header compression method that obtains from the same protocol data unit header information of a lower protocol layer of a plurality of protocol layers and header information of a higher protocol layer of the plurality of protocol layers. The obtained header information of the lower protocol layer is compressed with a compression scheme for the lower protocol layer and the obtained header information of the higher protocol layer is compressed with a compression scheme for the higher protocol layer. The compressed header information of the lower and higher protocol layers is concatenated to obtain compressed multilayer header information. Scheme information is gathered from the lower and higher protocol layers indicating the compression schemes for the lower and higher protocol layers. The gathered scheme information from the lower and higher protocol layers is concatenated to obtain a combination of the scheme information, and identification information for the obtained combination of the scheme information is generated by representing the obtained combination of the scheme information using a single unique expression or number. The generated identification information is added to the obtained, compressed multilayer header information.

BEST MODE FOR CARRYING OUT THE INVENTION

With reference now to the attached drawings, an embodiment of the present invention will be explained in detail below.

In the following description, for the purpose of explanation of the present invention, specific numbers, times, structures and other parameters are set forth in order to provide a thorough understanding of the present invention. Following paragraphs give an exemplification of how the invention can be implemented. However, without such details, it will be apparent to anyone skilled in the art that the present invention can be practiced.

This section will disclose an apparatus for controlling network resources at Layer 2 of the OSI (Open System Interconnection) model applied to a wireless network. To help understand the present invention easier, the following definitions will be used:

Protocol data unit (PDU) . . . A single of data packet made up of header information and payload for successful delivery from source to destination.

Data stream . . . A group of protocol data units delivered at different time points and having similar destination and source identification over a finite period of time.

Encoding section . . . Functional module or device which compresses a selected part of protocol data unit.

Decoding section . . . Functional module or device which decompresses a selected part of protocol data unit.

Session context ID manager . . . Functional module or device which carries out a header compression session of data packet exchange between two sets of protocol stack control entities each of which controls at least one protocol stack.

Packet stream registration section . . . Functional module or device used to register and identify a data packet stream made up of one or more data packets for connection type or connectionless type network requiring compression or decompression.

Protocol layer interface (I/F) . . . Functional module or device used to identify a data packet stream made up of data packets with header information from protocol stacks in both compressed and uncompressed form.

Layer management entity interface (I/F) . . . Functional module or device used to control compression and decompression sessions required by the layer management entity usually used in coordinating control activities and mechanism of protocol stack layers.

Figure 1:
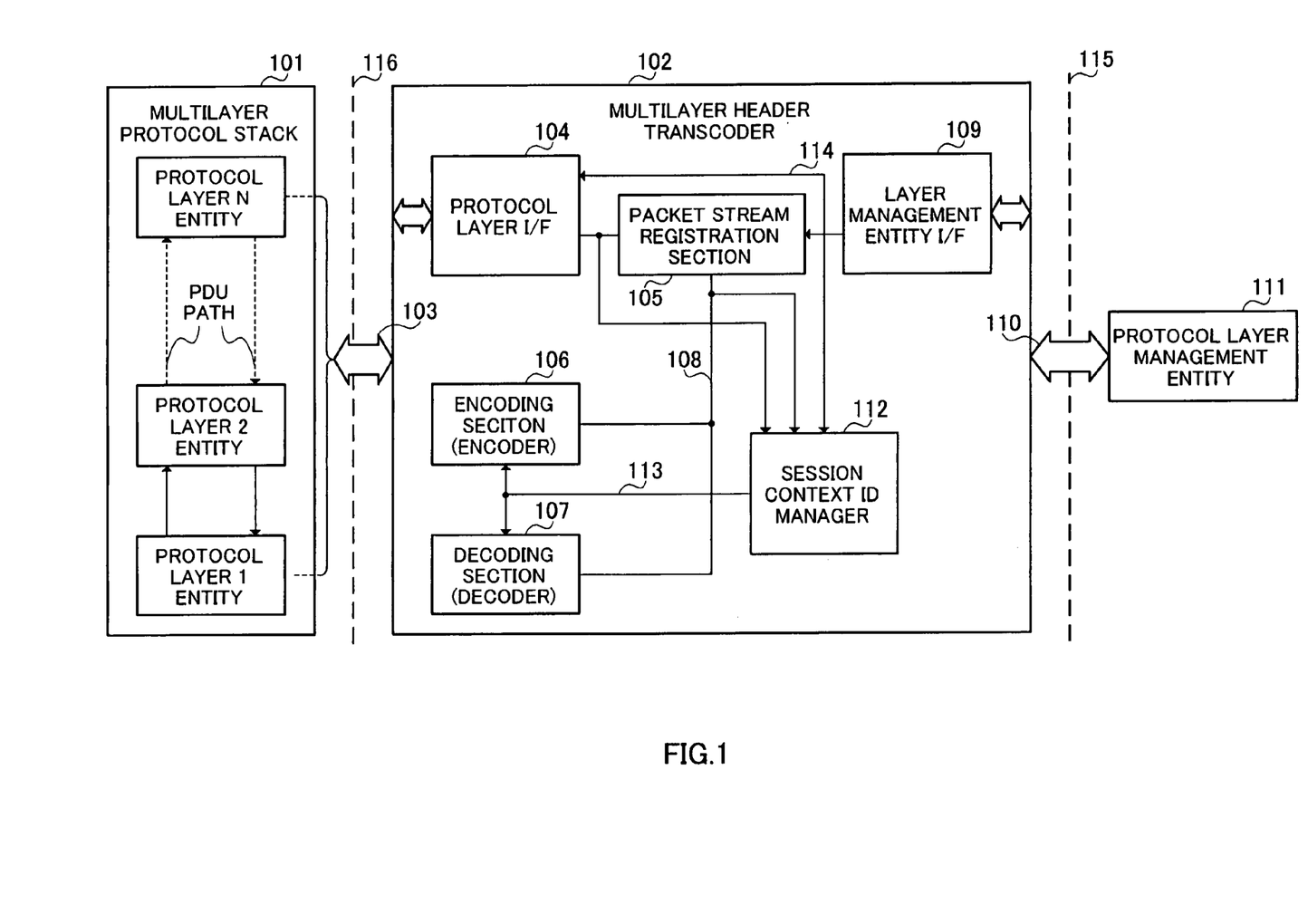
FIG. 1 illustrates an apparatus for compressing a multilayer protocol stack header according to an embodiment of the present invention and is a block diagram showing an overall structure of a transcoder used for compressing header information of the multilayer protocol stack.

The apparatus in FIG. 1 shows a multilayer protocol stack protocol data unit header information transcoder according to an embodiment of the present invention. A multilayer header transcoder 102 is a device including methods and submodules for encoding and decoding header information and coordinating and controlling compression and decompression processes of header information. When a data header needs to be compressed or decompressed for a data packet which is generated or received by a protocol layer, such compression and decompression are performed at the multilayer header transcoder 102. Header information of the data packet is exchanged between the multilayer header transcoder 102 and each protocol layer stack through a data bus indicated by reference numeral 103. To support compression of header information, a PDU is sent to the multilayer header transcoder 102 through an interface 116, and the existing protocol stack need not be modified.

This multilayer header transcoder 102 is designed to be used for a legacy multilayer protocol stack 101 or a new protocol stack layer so as to compress and decompress header information of a data packet unit which is exchanged between two network nodes or components. Since the new protocol stack functions so as to eliminate redundancy and irrelevance of the header information, the multilayer header transcoder 102 can send a data stream packet to the destination with less overhead. This improves the throughput at the transmitter end.

Control of packet data units transfer between different protocol stack layers is coordinated by a protocol layer I/F 104. Information used to identify the protocol stack layers to be compressed depends on the information provided by a layer management entity I/F 109. This information passes through a single path indicated by reference numeral 114. The information handed over by the layer management entity I/F 109 is used to be presented to the protocol layer I/F 104, a session context ID manager 112 and a packet stream registration section 105. Here, the data field of the header information is compressed or decompressed and the protocol stack layer compressed header information is applied. Data packets which pass through different protocol layers upward and downward are monitored by the protocol layer I/F 104, and only those requiring compression or decompression of header information from the data packet stream are extracted, redirected through a bidirectional single path 108 and sent to an encoding section 106 or a decoding section 107.

Before being redirected, the data packet information is interpreted and the header information is parsed by the packet stream registration section 105. Data packets which need to be compressed are compressed based on information specified by a protocol layer management entity 111. Data packets which have passed through different protocol layers and include a compressed or uncompressed header need to be processed, and they are directed to the encoding section 106 or decoding section 107. The path for the PDUs for compression and decompression in the transcoder is the bidirectional path 108 which traverses through the packet stream registration section 105.

The interface indicated by reference numeral 116 is also known as a data plane interface and is defined as header information protocol data unit header information between the multilayer header transcoder 102 and a multilayer protocol stack 101. The interface 116 is used as the data plane to compress and decompress header information. An interface indicated by reference numeral 115 functions as an interface for control information to enable compression and decompression of header information. The interface 115 is known as a control plane interface to allow the protocol layer management entity 111 to control and coordinate compression of header information.

The data plane interface 116 is made up of two types of data flows. That is, (i) an uncompressed PDU stream and (ii) a compressed PDU stream. Uncompressed and compressed PDU streams for the protocol layer are passed through the protocol layer I/F 104, input to the multilayer header transcoder 102 and then redirected to a protocol layer. Uncompressed data streams requiring header compression will be compressed according to the encoding section 106 and other control processes provided by the multilayer header transcoder 102. The protocol layer I/F 104 is the first stage of compressed PDU data stream monitoring and detection carried out before the compressed PDUs reached the designated protocol stack layer.

The control plane interface 115 is made up of two types of data flows. That is, (i) a control information flow from the protocol layer management entity 111 and (ii) result information from the multilayer header transcoder 102. The control information from the protocol layer management entity 111 can follow the following format:

```
Structure Transcoder_Control
{
number of protocol stacks;
/* number of protocol stack for header compression */
stack description;
/* protocol stack description or representatives
thereof */
}
```

In order to perform a new stream session for the data packets with compressed header information, the encoding section 106 executes the encoding process. The packet stream registration section 105 is requested to transmit an internal signal so that a unique session used as part of compression of header information by the session context ID manager 112 can be used through the single path indicated by reference numeral 108. In the decoding process, the packet stream registration section 105 redirects the data packets intercepted at the protocol layer I/F 104 and their header information to be decompressed are passed to the decoding section. All the compressed and uncompressed data information extracted from the multilayer protocol stack 101 and processed by the encoding section 106 and decoding section 107 are returned to each protocol layer for processing by each protocol layer. The process of acquiring packet header information of each data packet from the protocol layer and the process of returning this information are performed by the protocol layer I/F 104.

Figure 2:
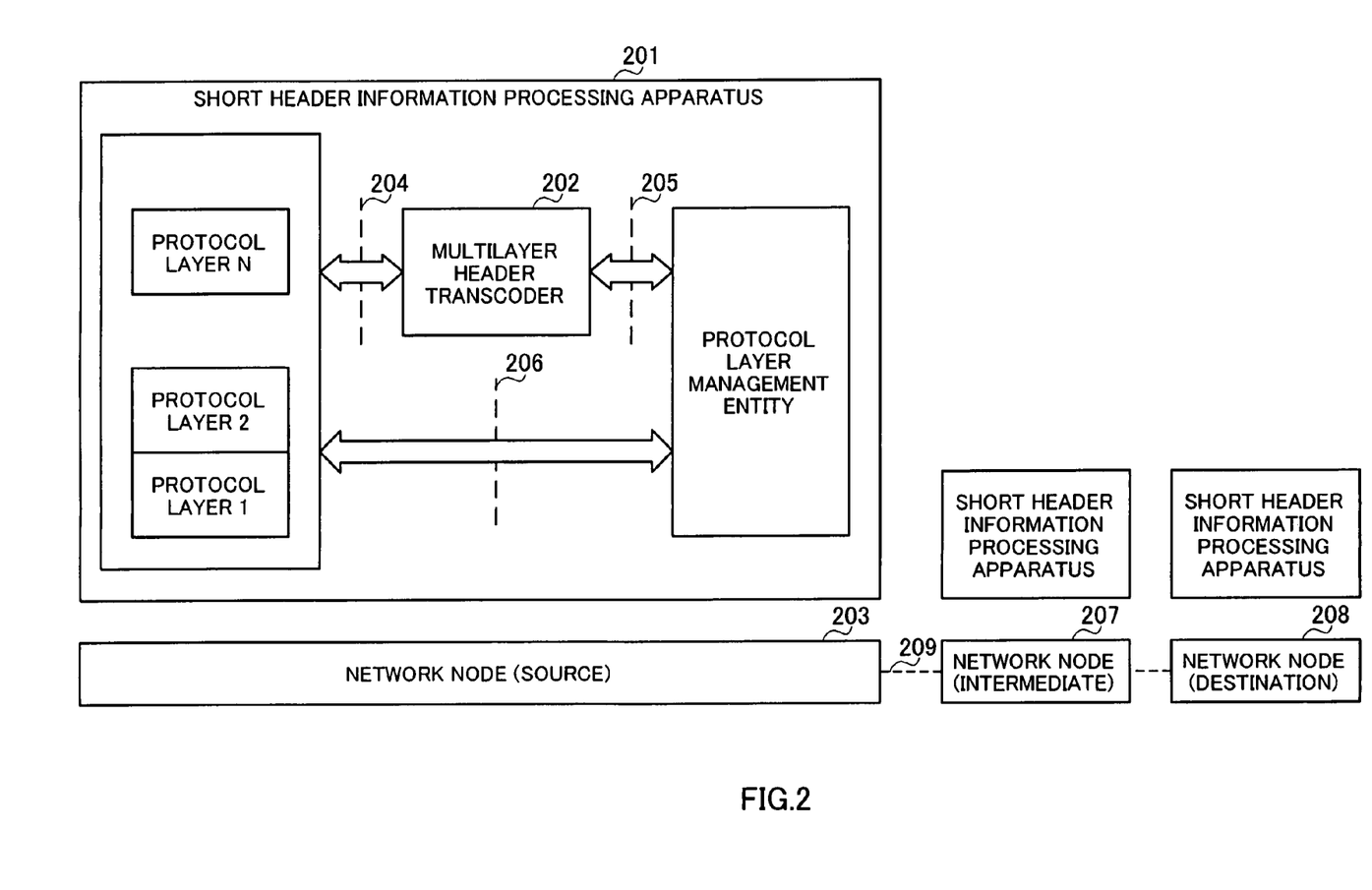
FIG. 2 illustrates a network system configuration for header information compression according to the embodiment of the present invention and illustrates a network system configuration and a network node overall structure in implementing multilayer protocol stack header information compression.

FIG. 2 shows a configuration example of the multilayer header transcoder 102 according to an embodiment of the present invention (in FIG. 2, however, described as "multilayer header transcoder 202") which can be implemented in a general network configuration. In order for end-to-end protocol data units including compressed header information to be exchanged between any two nodes in the network, a source node 203, a destination node 208 and an intermediate node 207 are required to be able to perform short header information processing indicated by reference numeral 201. Before the protocol data unit reaches the destination node 208 from the source node 203, the protocol data unit needs to pass through a plurality of intermediate nodes 207 provided with short header information processing capabilities. A transmission medium 209 of the protocol data unit may be a wireless medium or wired medium. The short header information processing apparatus 201 capable of short header information processing is constructed of a generic protocol stack and a protocol layer management entity which can be connected to a multilayer header transcoder 202. The interface between the protocol layer and the multilayer header transcoder 202 is a data plane interface 204, where header information is retrieved and inserted into the corresponding protocol stack layer. The protocol stack layer requires header compression and decompression. The interface provided for the protocol layer management entity of the generic network node is a control plane interface 205.

Figure 3:
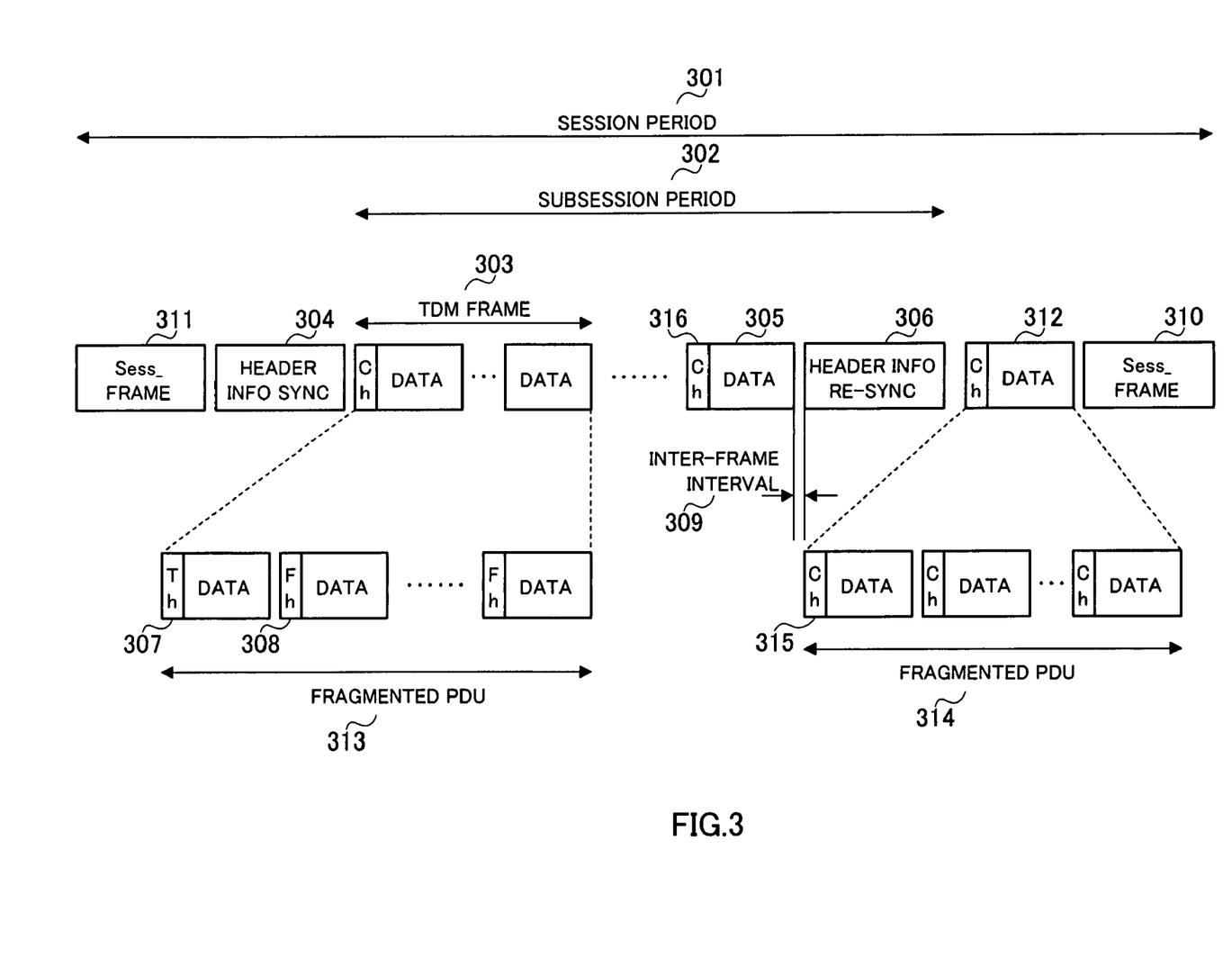
FIG. 3 illustrates a header compression session period according to the embodiment of the present invention, shows the structure and elements of the session period and illustrates a detailed structure showing how compression is applied for different types of data exchange.

FIG. 3 shows the embodiment of the present invention when a session is carried out on a compressed header exchanged between two network nodes. The execution of the session is determined by the session context ID manager 112. This is also based on control information which is received from the protocol layer management entity 111 through the control plane interface indicted by reference numeral 115. A session period 301 is generated by sending a session frame 311 to a destination node to indicate the beginning of a protocol data unit including a compressed header. This session frame, that is, an indicator can be piggybacked onto an existing protocol data unit. The session frame is generated by only a transcoder before the protocol layer which is the bottom layer of the multilayer protocol stack using compressed header information in the protocol data unit. Subsequent payloads from upper layers can be easily sent through a layer which gives a compressed header to the protocol data unit.

After the beginning of the session period 301 is indicated, a header Info Sync (information synchronization) 304 is sent to indicate capability. This capability includes types of compression which can be executed within the session period. It also includes types of compression carried out on the address field, control field and others of a PDU. This capability field can be used for future extensions of header information embedded in the PDU protocol stack to use a different control mechanism in the future. Furthermore, the header Info Sync 304 can also be piggybacked onto the existing protocol data unit of the protocol stack from which the multilayer protocol layer header information starts. All data PDUs and PDU fragments are separated by inter-frame intervals 309. The structure of a session frame (Sess_Frame) 311 is as follows:

```
Structure Sess_Frame
{
Sess_Frame control data type;
/* bit format to indicate Sess_Frame */
frame period;
/* session period in unit of second or other
representatives */
capability information ;
/* compression capability types */
}
```

The format of the header Info Sync 304 includes the following: That is, information, the number of TDM frames 303, fragmented TDM frame group, the number of bytes or period between the header Info Re-Syncs (information resynchronization) 306, number of protocol data units that can be fragmented, the period expressed by the number of bytes or time between Sess_Frames 311, session context ID group which is a unique number generated and managed by the session context ID manager and context stream field. A Sess_Frame (session frame) indicated by reference numeral 310 is used to mark the end time of the session period. It also indicates the beginning of the next session period 301. The Sess_Frame formats for the beginning and end of the session periods can be similar to or different from each other. A format example of the header Info Sync 304 is expressed in a structure format as follows:

```
Structure Header Info Sync (information synchronization)
{
header Info Sync control data type;
/* bit format to indicate header Info Sync frame */
number of TDM frames;
/* number of TDM frames between two Sess Frames */
groups of fragmented TDM;
/* number of allowable fragmented TDM frames within
session period */
header Info Re-Sync (information resynchronization)
interval;
/* minimum duration measured in seconds or bytes between
header Info Re-Syns */
groups of fragmented PDU;
/* number of allowable fragmented PDU frames within
session period */
session period;
/* total session period */
session context ID field;
/* plurality of unique IDs for data delivery to different
destination nodes */
context stream;
/* header information of multilayers of protocol stack
*/
}
```

After the header Info Sync 304 is transmitted, data may be exchanged between a source node and various destination nodes. Data transmission may have the format of the TDM frame 303 and data 305 of a PDU containing compressed header information. A frame period between any two Info Re-Syncs 306 or a period between one frame of the header Info Re-Sync 306 and header Info Sync 304 is named "subsession period 302." When the header information is damaged seriously due to a loss of data, the error can be contained within a short period of time by the subsession period. Also, this assists in implementation of effective compression. The header Info Re-Sync 306 is constructed of unique control data types to indicate the header Info Re-Sync 306 and some of all other fields of the header Info Sync 304.

A TDM frame 303 or a normal PDU with compressed header can be fragmented into a fragmented TDM frame 313 and a fragmented PDU 314, respectively. The TDM frame 303 is many PDU payloads concatenated without being separated by inter-frame intervals and with one compressed header. The headers of the data 305 and PDU 312 include subsession subfield ID and sequence control. The following format is an example of the header format indicated as ch316:

```
ch
{
ch control data type;
/* bit format to indicate beginning of TDM or PDU frame
*/
subsession subfield ID;
/* address field to indicate final destination node
transmitted within session period */
sequence control fields;
/* control fields to control sequence of TDM and PDU
for data streams to specific destination */
}
```

In the fragmented TDM frame 313, two types of fragmented PDU header information to indicate the beginning of a fragmented TDM session and subsequent TDM session. That is, (i) Th 307 and (ii) Fh 308. The following is an example of header format about Fh 308 and Th 307:

```
Th
{
Th control data type;
/* bit format to indicate beginning of Th PDU */
subsession subfield ID;
/* address field to indicate final destination node
transmitted within session period */
sequence control fields;
/* control fields to control sequence of TDM and PDU
for data streams to specific destination */
number of fragments;
/* number of trailing fragmented Fh header PDUs */
}
fh
{
fh control data type;
/* bit format to indicate beginning of fh PDU */
sub-fragment sequence number;
/* fragment sequence number */
}
```

In the case of the fragmented PDU 314, the first fragmented PDU includes a header Ph 315 followed by the trailing fragments with fh header. The header format of the Ph 315 is as follows:

```
Ph
{
Ph control data type;
/* bit format to indicate beginning of Ph PDU */
subsession subfield ID;
/* address field to indicate final destination node
transmitted within session period */
sequence control fields;
/* control fields to control sequence of TDM and PDU
for data streams to specific destination */
number of fragments;
/* number of trailing fragmented Ph header PDUs */
}
```

Figure 4:
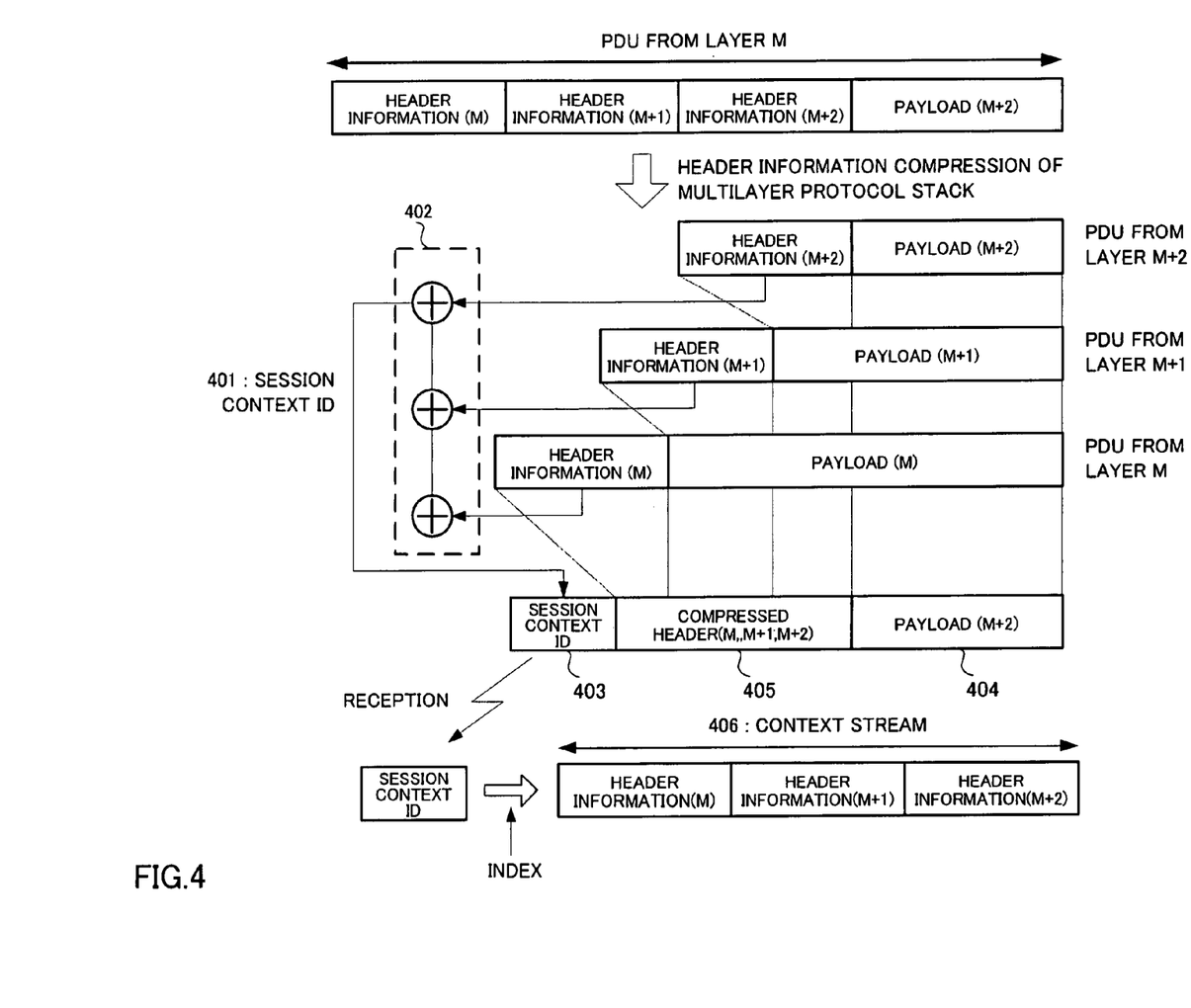
FIG. 4 illustrates a PDU including compressed header information according to the embodiment of the present invention and shows a detailed overview about how header information compression is implemented.

In order to compress header information suitable for multilevel protocol data layers, FIG. 4 shows a basic method for generating a unique representations by the session context ID manager 112 of FIG. 1. An example of generating a session context ID is shown in FIG. 4. Here, a case where the header is compressed in three levels of protocol stack, that is, the Mth, (M+1)th and (M+2)th layers will be explained as an example. In the following explanations, the Mth layer is called "layer M", the (M+1) th layer is called "layer M+1" and the (M+2) th layer is called "layer M+2."

The protocol layer (layer M+2) which is the top layer has a payload 404. The header information for the protocol stack layer, that is, the bottom layer in this case is the layer M. The header information of three layers, that is, Mth layer, (M+1) th layer and (M+2)th layer in this example is registered by concatenating the header information of the Mth layer, (M+1)th layer and (M+2)th layer. Therefore, the protocol data unit from the layer M extracted to the multilayer header transcoder 102 side through the protocol layer I/F 104 has a format in which the header information of the layer M+2, header information of the layer M+1 and header information of the layer M are concatenated to the payload of the layer M+2.

The header information of the multilayer protocol stack 101 in the protocol data unit having the above described format is compressed by the encoding section 106. More specifically, compression processing is applied to the header information of the layer M+2, header information of the layer M+1 and header information of the layer M, respectively. The header information of the respective layers subjected to compression processing is concatenated, and thus a compressed header 405 is generated.

Furthermore, information on a scheme for compressing header information (e.g., address information of the bottom layer of the multilayer protocol stack being used, how header information is compressed for each layer, and the like) is gathered into a concatenating process section indicated by reference numeral 402. Then, the concatenating process section 402 executes the concatenating process and the header information after the concatenating process finally becomes a session context ID 401 which represents the header information compression scheme using a single unique expression or number. The session context ID 401 generated is inserted into a section 403 before the compressed header 405. Then, the compressed protocol data unit and session context ID 401 generated in this way are returned to the multilayer protocol stack 101 side through the protocol layer I/F 104. Then, the compressed protocol data unit is sent/received between network nodes together with the session context ID 401 according to the communication session explained with reference to FIG. 3.

That is, at the network node which has received a compressed protocol data unit, an index is added using the session context ID 401 acquired during the session period during which the protocol data unit is received, and a context stream 406 with the header information of the layer M, layer M+1 and layer M+2 is thereby formed. In this way, the compressed header 405 is decompressed. The context stream 406 forms one of the fields of the header Info Sync format.

Incidentally, when the multilayer header transcoder 102 decompresses a protocol data unit with the compressed header 405 and payload 404, the protocol data unit is extracted to the multilayer header transcoder 102 side through the protocol layer I/F 104, whereas the session context ID 401 corresponding to the protocol data unit is acquired by the session context ID manager 112 through the protocol layer I/F 104. Then, the decoding section 107 decompresses the compressed header 405 using the acquired session context ID 401. The decompressed protocol data unit is returned to the multilayer protocol stack 101 side through the protocol layer I/F 104.

Here, the session context ID 401 to be generated will be explained in further detail. However, for clarity of explanation, suppose a case with three level protocol stacks, each protocol layer having five header compression schemes (that is, five types of session context). Expressing five sets of header compression schemes requires three bits. If an emphasis is laid on compression at a single layer as the prior art, $3\times3=9$ bits must be used. On the contrary, when the session context ID 401 is used, the session context ID 401 alone can represent multilayer header information compression schemes, and therefore $5^3=125$ combinations can be represented using only 6 bits.

Furthermore, the session context ID manager 112 detects differences among header information included in a plurality of protocol data units (e.g., two consecutive protocol data units) belonging to a certain PDU stream to be sent. As a result of this detection, when it is detected that there is no difference among header information, the session context ID 401 corresponding to the subsequent protocol data unit out of the plurality of protocol data units becomes the one corresponding to the preceding protocol data unit, and therefore it is also possible to control so as to prevent its transmission.

The differences among the header information may be detected either before or after the session context ID 401 is generated. Especially in the case of before the session context ID 401 is generated, the differences need to be detected for each layer of the multilayer protocol stack, but the range of the differences to be detected becomes smaller, and the probability that the header information may be decided to be the same will increase. Thus, when it is detected that there is no header information difference among a plurality of protocol data units, it is possible to omit transmission of the session context ID 401 corresponding to the subsequent protocol data unit, and therefore it is possible to further reduce the time and bandwidth used for a communication session.

Figure 5:
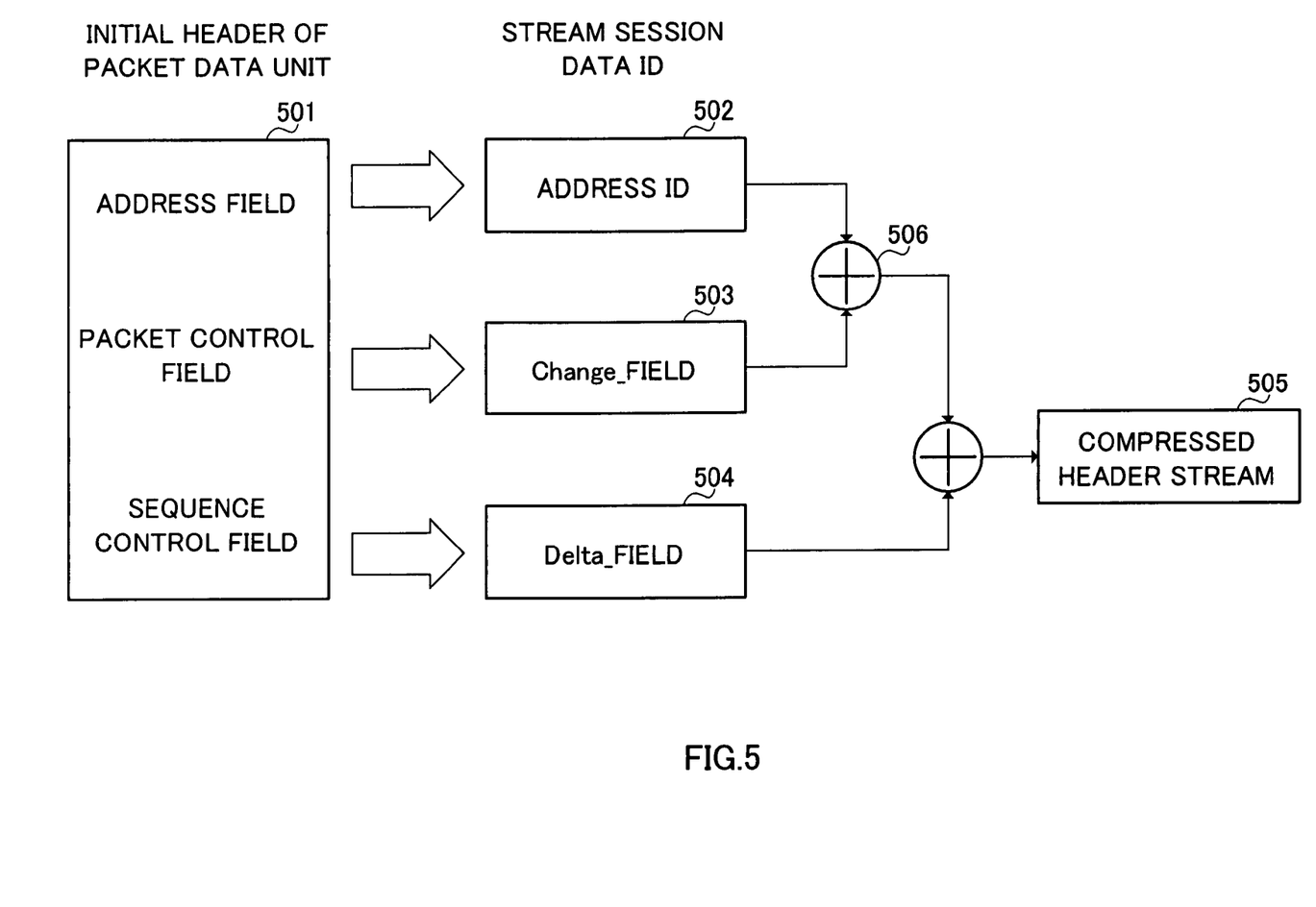
FIG. 5 illustrates a compressed header stream format according to the embodiment of the present invention and shows a typical format of a compressed header for a single protocol stack.

FIG. 5 shows how the header information of a specific protocol layer is used to form the compression (Comp) header 405 in the present invention. The header compression format indicated as the Comp header 405 is as follows:

```
Structure Comp header
{
number of layers;
/* number of protocol layers being compressed */
layer with change;
/* to indicate protocol layer with header information
change */
compressed head stream;
/* changes in compressed header of protocol layers */
}
```

The header information of the PDU used to exchange data with another layer entity of the same protocol layer within each protocol layer has three basic fields. That is, (i) address field, (ii) packet control field and (iii) sequence control field. The address field is converted to an address ID 502 which can be one of the following data field types. That is, (i) session context ID 401, (ii) full address field in the address field at the initial header 501 of a packet data unit, (iii) null field indicating that the address field is indicated by an earlier PDU. The packet control field at the initial header 501 is converted to a Change_field 503, and the change is indicated in the field. When there is no change based on the previous PDU, a null value is used to indicate that there is no change. When there is some change, a different value is used to indicate the change in the packet control field. The sequence control field at the initial header 501 is converted to a Delta_field 504, and the change is based on the difference in values based on the last transmitted PDU. The operator indicated by reference numeral 506 is used to concatenate the address ID 502, Change_field 503 and Delta_field 504 to form a compressed header stream 505.

Figure 6:
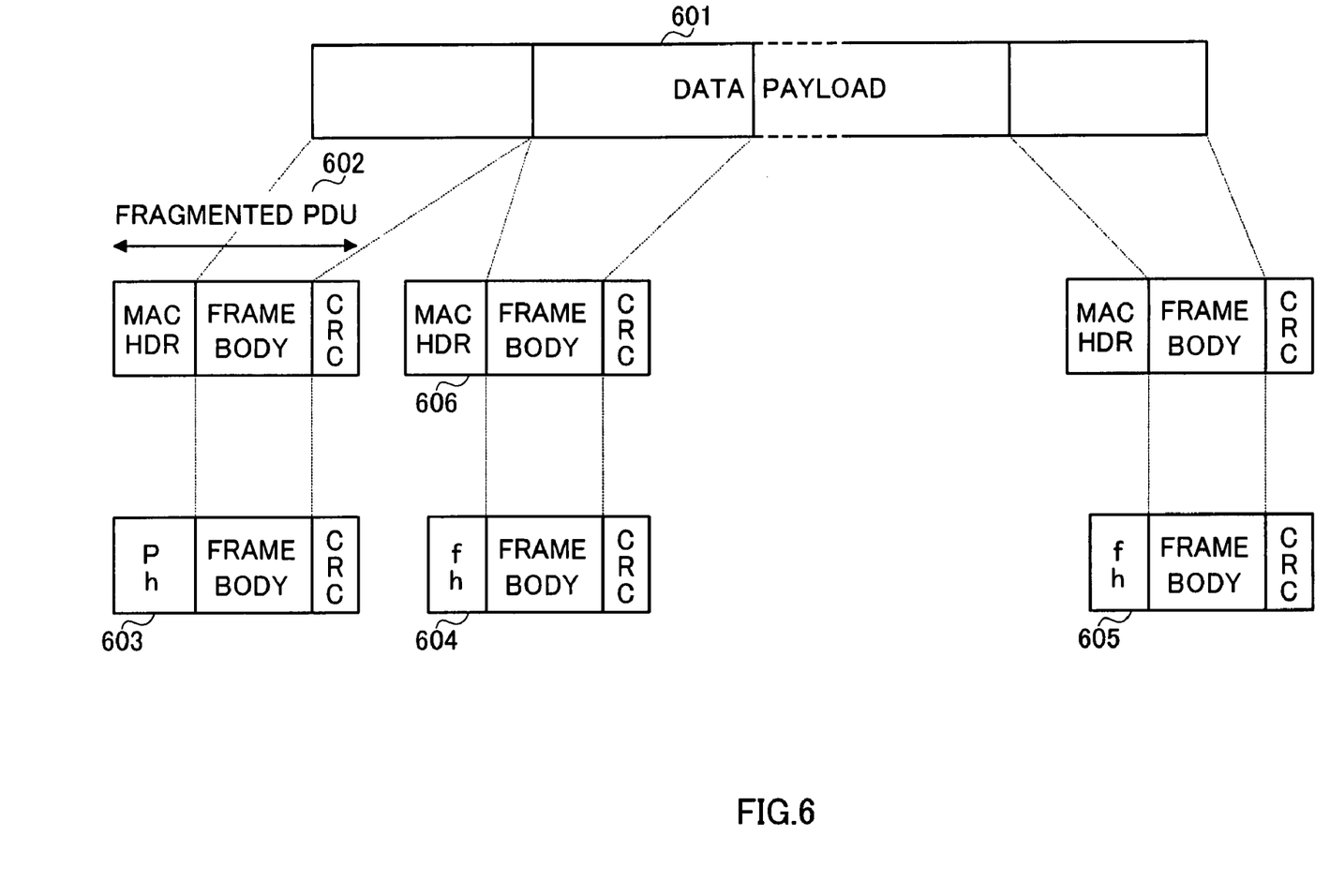
FIG. 6 illustrates compressed header information for fragmented PDUs according to the embodiment of the present invention and shows a detailed overview about how compression of header information can be applied when fragmentation is applicable.

When a data packet is delivered between two network nodes where there is no intermediate node in-between, the protocol layer at the bottom layer of the multilayer protocol stack can be fragmented. FIG. 6 shows the embodiment showing how to save the bit rate and how the header is compressed to improve the throughput. A data payload 601 is fragmented into more than one fragmented PDU 602. Fragmentation is often applied to improve the success rate of transmission with wireless media where a transmission medium is shared and almost no coordination is made among transmission stations that share the transmission medium. These fragmented PDUs 602 each usually have duplicated header information. To enable header information of a single protocol layer to be compressed, the first fragmented PDU in this process includes a Ph header 603 and the trailing fragmented PDUs include an fh header 604. The final fragmented section 605 includes the same field as the fh header.

Thus, according to this embodiment, redundancy and irrelevance of the data packet header information are eliminated and the payload throughput in different layers of the protocol stack improves. In short, the present invention improves the throughput and reduces consumption of the overhead bit rate which is an expensive commodity when transmission is carried out using wireless media. The present invention provides an apparatus and method that enables the multilayer protocol stack to use header compression. This makes it possible to reduce the overall overhead bit rate and improve the overall throughput for a network node. Furthermore, according to this embodiment, the legacy protocol stack and network node can use header compression without modifying the control mechanism of the existing protocol stack. In the world of the IP network, it is extremely difficult to exclude an existing protocol and system and introduce a new system, which should be avoided, and therefore the possibility of adding-on a header compression function without having to re-implementing a protocol is a great merit of the present invention.

This application is based on the Japanese Patent Application No.2002-234043 filed on Aug. 9, 2002 and the Japanese Patent Application No.2003-289974 filed on Aug. 8, 2003, the entire contents of which are expressly incorporated by reference herein.

Industrial Applicability

The header compression/decompression apparatus and header compression/decompression method according to the present invention has an effect of improving the overall throughput of the multilayer protocol stack at network nodes and is useful in a communication system that supports a multilayer protocol stack.

What is claimed is:

1. A multilayer header compression apparatus comprising:
an obtainment section that obtains from the same protocol data unit header information of a lower protocol layer of a plurality of protocol layers, and header information of a higher protocol layer of the plurality of protocol layers;
a compression section that compresses the obtained header information of the lower protocol layer with a compression scheme for the lower protocol layer, and the obtained header information of the higher protocol layer with a compression scheme for the higher protocol layer;
a header information concatenation section that concatenates the compressed header information of the lower and higher protocol layers to obtain compressed multilayer header information;
a gathering section that gathers from the lower and higher protocol layers scheme information indicating the compression scheme for the lower protocol layer, and scheme information indicating the compression scheme for the higher protocol layer;
a scheme information concatenation section that concatenates the gathered scheme information from the lower and higher protocol layers to obtain a combination of the scheme information;
a generation section that generates identification information for the obtained combination of the scheme information by representing the obtained combination of the scheme information using a single unique expression or number; and an addition section that adds the generated identification information to the obtained, compressed multilayer header information.

2. The multilayer header compression apparatus according to claim 1, wherein:

said header information concatenation section arranges the compressed header information in a predetermined order and then concatenates the arranged, compressed header information, and said scheme information concatenating section arranges the gathered scheme information in an order corresponding to the order in which the compressed header information are arranged, and then concatenates the arranged, gathered scheme information.

3. The multilayer header compression apparatus according to claim 1, further comprising:

a control section that performs control such that, when there is no difference between a plurality of header information respectively included in a plurality of protocol data units belonging to the same stream, transmission of identification information generated for a late protocol data unit of the plurality of protocol data units is avoided.

4. The multilayer header compression apparatus according to claim 3, further comprising:

a detection section that detects whether there is said difference before identification information is generated for said later protocol data unit.

5. The multilayer header compression apparatus according to claim 3, further comprising:

a detection section that detects whether there is said difference after identification information is generated for said later protocol data unit.

6. The multilayer header compression apparatus according to claim 1, further comprising:

a data plane interface that extracts from a stream passing through a multilayer protocol stack an uncompressed protocol data unit including at least header information of the lower protocol layer, header information of the higher protocol layer, and a payload, and returning to the stream passing through the multilayer protocol stack a compressed protocol data unit including at least the generated identification information, the obtained, compressed multilayer header information, and the payload.

7. A multilayer header compression method comprising:

obtaining from the same protocol data unit header information of a lower protocol layer of a plurality of protocol layers, and header information of a higher protocol layer of the plurality of protocol layers;

compressing the obtained header information of the lower protocol layer with a compression scheme for the lower protocol layer, and the obtained header information of the higher protocol layer with a compression scheme for the higher protocol layer;

concatenating the compressed header information of the lower and higher protocol layers to obtain compressed multilayer header information;

gathering from the lower and higher protocol layers scheme information indicating the compression scheme for the lower protocol layer, and scheme information indicating the compression scheme for the higher protocol layer;

concatenating the gathered scheme information from the lower and higher protocol layers to obtain a combination of the scheme information;

generating identification information for the obtained combination of the scheme information by representing the obtained combination of the scheme information using a single unique expression or number; and adding the generated identification information to the obtained, compressed multilayer header information.

* * * * *